United States Patent Office
3,606,439
Patented Sept. 20, 1971

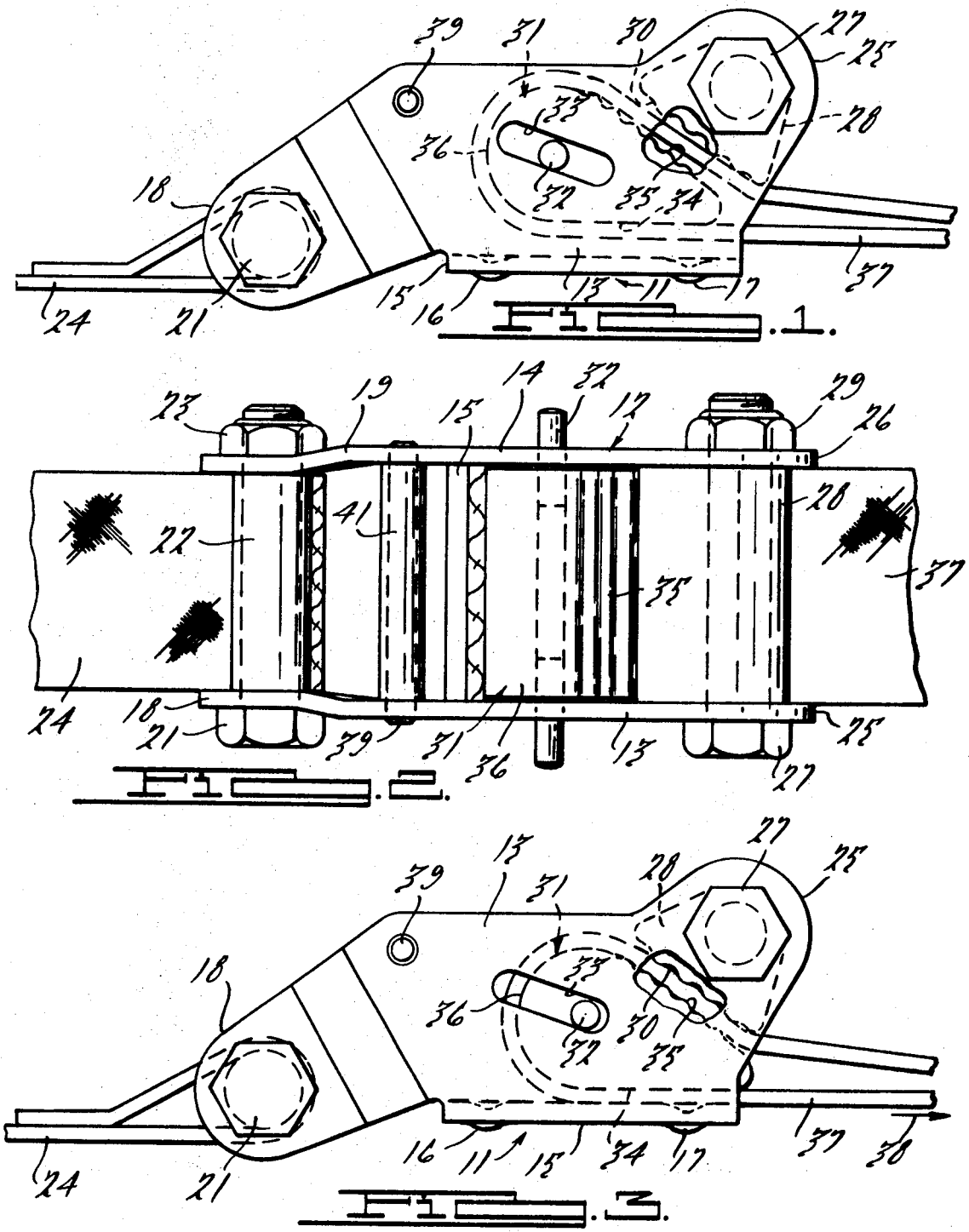

3,606,439
WEBBING GRIPPER
Louis W. Rutan, Clark Lake, Mich., assignor to
Aeroquip Corporation, Jackson, Mich.
Filed Feb. 19, 1969, Ser. No. 800,618
Int. Cl. B66c 1/12
U.S. Cl. 294—74        1 Claim

ABSTRACT OF THE DISCLOSURE

A device for adjusting the length of webbing legs in cargo slings. A U-shaped body has a wedge extending between the side walls, with pins guided by slots in these walls. A smooth surface of this wedge faces the central body section and a serrated surface faces a similar serrated surface on a stationary pressure bar extending between the side walls. The webbing to be adjusted is wrapped around the rounded large end of the wedge and passes between the wedge and the pressure bar on one side, and the wedge and central body section on the other side. The slots are inclined, and tension on the webbing thus forces the wedge toward both the central body section and pressure bar to grip the webbing on both sides. A cross pin bridges the side walls adjacent the wide end of the wedge and prevents an excessive-sized loop from forming in the webbing should it be momentarily loosened.

BACKGROUND OF THE INVENTION (1) Field of the invention

The invention relates to webbing grippers usable in environments such as cargo sling assemblies for helicopters or the like, in which the length of a sling leg could be adjusted from time to time and, with tension in the webbing, held in its adjusted position.

(2) Description of the prior art

A conventional device for adjusting webbing in such an environment utilizes a rotating buckle having reel bars and a ratchet. Aside from the inconvenience of such an arrangement, it has been found difficult to provide sufficient ratcheting action with heavier webbing used to increase the basic sling strength. Without adequate locking action, the webbing would pull through the reel bars, resulting in failure of the sling and dropping of the loads that the sling was handling.

SUMMARY OF THE INVENTION

According to the invention, a body is provided having side walls and a central section. A bolt and spacer bridge one end of the side walls for attachment to the sling assembly. A stationary pressure bar with a serrated face extends between the side walls at the other end of the body, and a wedge is slidably mounted between the pressure bar and the central body section. The wedge has a rounded surface at its wider end and a serrated surface facing the pressure bar, the surface facing the central body section being smooth. The webbing to be adjusted is threaded between the wedge and central body section, wrapped around the wide end of the wedge and then threaded between the wedge and the pressure bar. The wedge is guided by pins in inclined slots formed in the body side walls. Tension on the webbing will thus draw the wedge toward both the pressure bar and central body section, tightly engaging the webbing. A cross pin extends between the side walls adjacent the wide end of the wedge and prevents the webbing from slipping out of the webbing gripper or forming an excessively large loop of webbing under no-load conditions or during adjustment of the webbing.

The one-piece body of the webbing gripper provides maximum rigidity. Because of the relatively large surfaces on which clamping pressure is applied, and the fact that the webbing is not pressed against itself, webbing deterioration will be minimized. The gripper is self-adjusting with respect to thickness variations in the webbing. After readjustment of the webbing, it will be automatically gripped upon reapplication of the load and will be self-releasing when the load is removed.

BRIEF DESCRIPTION OF THE DRAWINGS

FIG. 1 is a side elevational view of the webbing gripper with the wedge in its releasing position, parts being broken away for clarity;

FIG. 2 is a top plan view thereof, and

FIG. 3 is a view like FIG. 1 but showing the wedge in its gripping position.

DESCRIPTION OF THE PREFERRED EMBODIMENT

The webbing gripper is generally indicated at 11 and comprises a body generally indicated at 12, which has a pair of side walls 13 and 14 connected by a central section 15. Section 15 has a generally smooth inner surface, and a pair of stiffening ribs 16 and 17 are pressed outwardly therefrom. Walls 13 and 14 have extensions 18 and 19 respectively on one side thereof, and a bolt 21 extends through aligned apertures in the extensions. A spacer 22 is mounted on bolt 21, the latter being secured by a nut 23. A portion 24 of the cargo sling assembly is shown as being secured to spacer 22 and bolt 21, this portion of the sling comprising a webbing strap. The axis of bolt 21 is slightly above the inner surface of central body section 15, as seen in FIG. 1.

A pair of extensions 25 and 26 extend from walls 13 and 14 respectively at the end opposite that carrying bolt 21. A bolt 27 extends between extensions 25 and 26 and carries a stationary pressure bar 28. This pressure bar has an apertured portion through which the bolt passes, the latter being secured by a nut 29. Pressure bar 28 is flared, having a wider portion with a serrated surface 30 facing central body section 15 in an inclined manner.

A wedge generally indicated at 31 is disposed between side walls 13 and 14 and carries pins 32 which pass through a pair of slots 33 in the side walls. These slots are inclined at about one-half the angle of inclination of surface 30 of the pressure bar. The wedge has a smooth underside 34 and a serrated surface 35 facing surface 30. The wider portion of the wedge has a smooth rounded surface 36. Wedge 31 is thus movable between a releasing position, shown in FIG. 1, in which surfaces 34 and 35 are withdrawn from central body section 15 and pressure bar 28, respectively, and a gripping position shown in FIG. 3 in which surfaces 34 and 35 are advanced toward the central body section and the pressure bar. Thus, a webbing strap 37 which is threaded between central section 15 and wedge surface 24, then around wedge surface 36, and then between wedge surface 35 and pressure bar surface 30, will be gripped by application of tension (arrow 38) to the webbing strap. A gripping action will occur between both the smooth and the serrated pairs of surfaces which engage the strap.

To adjust the webbing strap, it is merely necessary to release the load thereon and thus permit wedge 31 to be moved to its retracted position. A cross pin 39 having a spacer 41, bridges side walls 13 and 14 a short distance from the wide end of wedge 31 and approximately in the with slots 33. Upon release of load 38, webbing 37 will tend to move to the left in FIG. 3, in which case the loop of webbing embracing surface 36 of the wedge will move outwardly and engage spacer 41, preventing the webbing from slipping out of the webbing gripper.

What is claimed is:

1. In a webbing gripper, a body having a pair of side walls and a central section, means at one end of the side walls for attaching a cargo sling, a stationary pressure bar extending between the side walls and spaced from the central section, the pressure bar having a surface facing the central section in an inclined manner, a wedge disposed between the central body section and pressure bar and extending between the side walls, said wedge having a first surface facing the central body section and a second surface facing the pressure bar, pin and slot connections between said wedge and side walls providing movement between a releasing position in which said surfaces are withdrawn from the central body section and pressure bar respectively, and a gripping position in which the surfaces are advanced, whereby a webbing strap threaded between the first wedge surface and body section, around the wider end of the wedge and then between the second wedge surface and pressure bar will be gripped in response to tension exerted on the webbing strap, said slots being inclined to approximately one-half the angle of inclination of the pressure bar surface which faces the central body section, whereby both surfaces of said wedge will exert a gripping action on said strap.

References Cited

UNITED STATES PATENTS

| 1,745,449 | 2/1930 | Poor | 294—74 |
| 2,080,148 | 5/1937 | Naysmith | 294—74 |
| 3,344,486 | 10/1967 | Eveland | 24—171X |

FOREIGN PATENTS

| 2,487 | 2/1908 | Great Britain | 24—194 |

RICHARD E. AEGERTER, Primary Examiner

D. D. WATTS, Assistant Examiner

U.S. Cl. X.R.

24—196